Feb. 6, 1934.    O. H. DICKE    1,945,804
HEAT REGULATING SYSTEM
Filed Sept. 19, 1929    2 Sheets-Sheet 1

INVENTOR
O. H. Dicke

Feb. 6, 1934.  O. H. DICKE  1,945,804

HEAT REGULATING SYSTEM

Filed Sept. 19, 1929  2 Sheets-Sheet 2

INVENTOR
O. H. Dicke

Patented Feb. 6, 1934

1,945,804

UNITED STATES PATENT OFFICE 1,945,804

HEAT REGULATING SYSTEM

Oscar H. Dicke, Rochester, N. Y., assignor to Pioneer Heat Regulator Corporation, a corporation of New Jersey Application September 19, 1929
Serial No. 393,704

32 Claims. (Cl. 236—76)

This invention relates to thermostatically controlled heating systems, and more particularly to a system for heating a home.

Certain furnaces, especially such as oil burning furnaces, require the controlling unit to assume more than merely two positions, such as fuel on and fuel off positions, they preferably have an intermediate position in which fuel is turned on at a lower rate. This same thing is also true of coal burning furnaces, in that only certain dampers are open in the intermediate position of the controlling unit. If thermostats of the bi-metallic type are used, in which bi-metallic metal bends in one direction or the other depending upon whether the temperature is increasing or decreasing it is found comparatively simple to add two stationary contacts to such element to be engaged by the bending of such metal, if however, it is desired to complete three different circuits depending upon temperature, it is much more difficult in that either a wipe contact or a snap acting contact, each of which require considerable energy to operate, would have to be used, and as soon as a thermostat element is required to do work it is no longer accurate as a temperature indicating device. In order to get accurate thermostatic control for three different circuits and in order to get this control without the expenditure of energy derived from the thermostat itself, it is proposed in accordance with the present invention to employ two separate thermostat elements and to render one of these elements effective when the other element assumes one extreme position, for in this way accurate results may be obtained in that there is no variable mechanical resistance to overcome, and there is no work to do, merely an engagement of contacts.

Also, it is desirable to have the thermostat element carry current for an instant only, and in accordance with the present invention it is proposed to provide a regulator mechanism which is initiated by snap action, and which cuts the current off of the thermostat element as soon as it is initiated, so that current need flow for an instant only. In accordance with the present invention, it is proposed to accomplish this by connecting the primary winding of a transformer in series with the regulator motor, the secondary of this transformer furnishing the current controlled by the thermostat elements, the impedance of the transformer being so high that the motor will not operate so long as they are connected in series, and to provide means for shorting the primary winding of said transformer to simultaneously, and by the same mechanism effect operation of the motor and the removal of current from the transformer.

Also, to comply with the fire underwriters and to avoid the possibility of electrocution of any one adjusting the thermostat, it is necessary to impress a minimum current, say 15 volts, on the thermostat, and in accordance with the first form of the present invention this is accomplished by the use of a step down transformer the low voltage of which is used to control the high voltage applied to the motor; and in the second and third form of the invention employ a double wound impedance in series with the motor the low voltage winding of which is short-circuited to allow operation of the motor.

Other objects, purposes and characteristic features of the invention will in part be apparent from the accompanying drawings, and will in part appear from the following detailed description.

In describing the invention in detail reference will be made to the accompanying drawings in which:—

Figure 1:
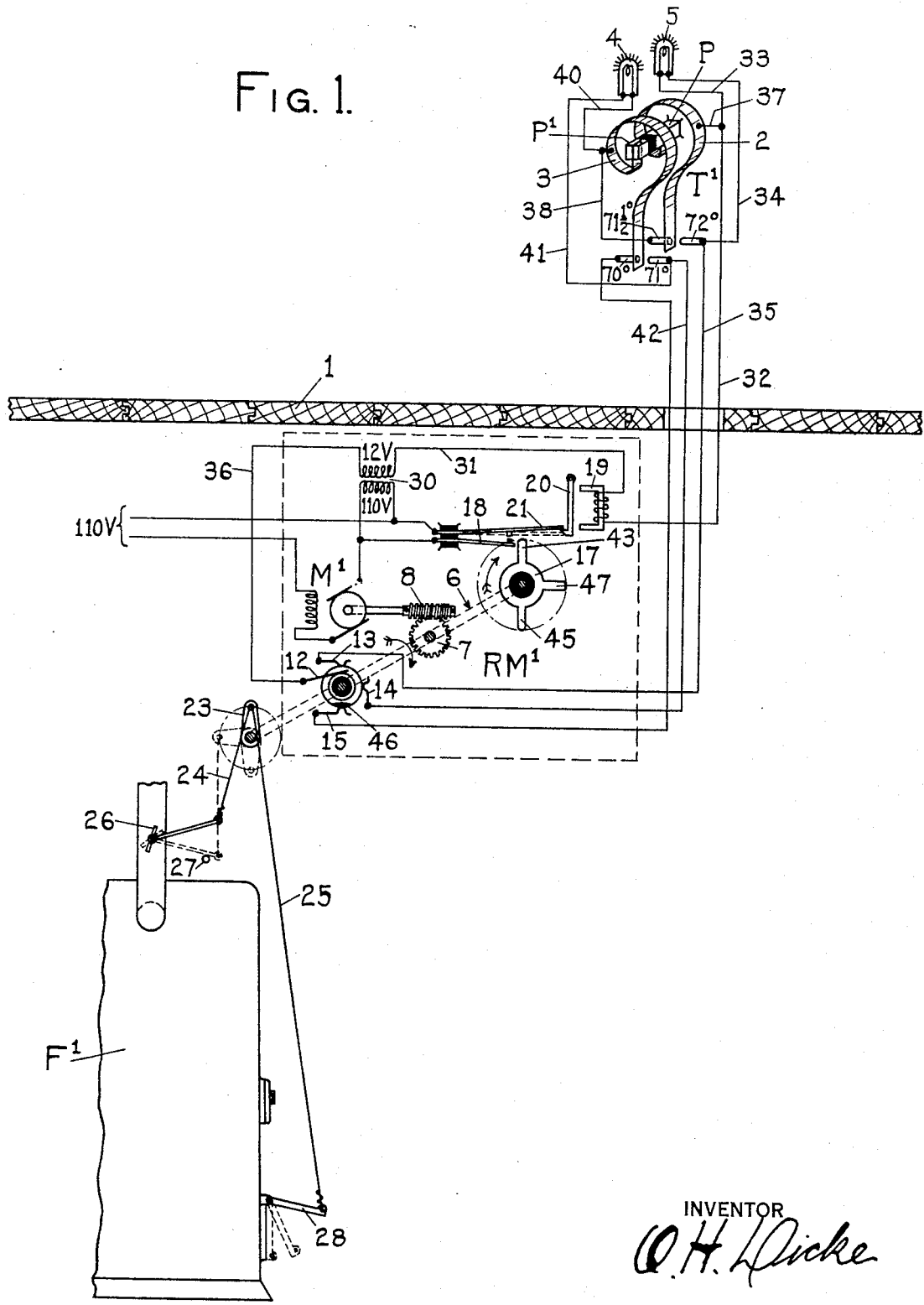
Fig. 1 illustrates one form of a three-position furnace regulator embodying the present invention.

*Structure.*—Referring to Fig. 1 there is shown a floor 1 separating the living room from the basement of a dwelling, in the living room of which is shown a thermostat $T^1$, and in the basement of which is shown a furnace $F^1$ controlled by the regulating motor $RM^1$ confined within a casing illustrated by the dotted rectangle. The thermostat $T^1$ comprises a stationary post P having an upper extension $P^1$ insulated therefrom, on the two parts of which are supported bi-metallic thermostat elements 2 and 3, respectively. These elements upon heating engage stationary contacts 72° and 71°, respectively, at temperatures of 72 degrees and 71 degrees, respectively, and upon cooling engage contact 71½° and 70° respectively, the reference characters of these stationary contacts also denote the temperature at which these bi-metallic metals just come in engagement with them, these stationary contacts of course being adjustable and they may be engaged at any other temperatures if desired, so long as their adjustment is such that the movement of these contacts is sequential. This thermostat T¹ also has associated therewith pilot and compensating lamps 4 and 5.

Referring now to the regulating motor RM¹, this mechanism comprises a shaft 6, which is driven through suitable reduction gearing 7—8 by a motor M¹. This shaft 6 is provided with a commutator 11 having brushes 12, 13, 14, and 15 cooperating therewith. This shaft 6 is also provided with a spider 17 adapted to engage the spring contact 18 of the snap circuit controlling mechanism including the electro-magnet 19, armature 20 and a latched spring contact 21. This shaft 6 also is provided with one or more cranks 23, which through suitable mechanism such as the chains 24 and 25 are adapted to control the fuel valves or the dampers of the furnace. In the particular arrangement shown, the chain 24 controls the butterfly valve 26 in the smoke pipe between the medium and the full open position of the regulating motor RM¹, this butterfly valve 26 being arrested by the stop 27, and the chain 25 controls the draft door 28 of the furnace to three different positions. It should be understood that where the shaft 6 is to operate fuel valves this may be accomplished by direct action, and without the use of the crank 23.

Operation.—The furnace has been shown open to the fullest extent and the thermostat elements have been shown reflecting a room temperature between 70 and 71 degrees, in that the thermostat element 2 is engaging the stationary contact 71½° and the thermostat element 3 is at an intermediate point between the stationary contact 70° and 71°. The transformer 30 has its primary winding energized by 110-V. alternating current, in that it is connected in series with the motor M¹, and the motor impedance is so low that practically full voltage is applied to the primary winding of transformer 30. Current may therefore flow to the pilot lamp 5 through the following circuit:—beginning at the twelve volt winding 12V of the transformer 30, wire 31, coil of the electro-magnet 19, wires 32 and 33, lamp 5, wires 34 and 35, contact brush 13, commutator 11, contact brush 12, wire 36, back to the transformer 30. Similarly the pilot lamp 4 is energized through the following circuit:—beginning at the secondary winding 12 V, wire 31, coil of electro-magnet 19, wires 32 and 37, thermostatic metal 2, stationary contact 71½°, wires 38 and 40, lamp 4, wires 41 and 42, contact brush 14, commutator 11, brush 12, wire 36, back to transformer 30. These lamps 4 and 5 draw very little current and this current is insufficient to actuate the electro-magnet 19. These lamps 4 and 5 do however furnish enough heat to move the last shifted thermal element 2 or 3 away from the stationary contact it last engaged even though the room temperature has not been changed. The term "room temperature" as herein used is the temperature of the room near the thermostat, but not effected by the lamps 4 and 5.

Let us now assume that the temperature in the living room gradually rises, and that the bi-metallic thermostat metal strip 3 moves to the right and engages the stationary contact 71°. In so doing, the lamps 4 and 5 will be short-circuited, and sufficient current will flow through the electro-magnet 19 to attract the armature 20 and release the contact spring 21. When this happens, this contact 21 will engage the contact 18, thereby short-circuiting the primary winding of transformer 30 so that the secondary winding will be dead, and applying the full voltage of the alternating current source to the motor M¹, thereby operating this motor and rotating the shaft 6 in the direction of the arrows. It is noted that the spider 17 will have to be rotated 180° before the prong 45 engages the contact spring 18 and lifts the springs 18 and 21, the prong 43 being the last one to have lifted the spring 18. The motor circuit will therefore remain closed until the spring 21 has been lifted up through the medium of contact 18 lifted by the prong 45, and the contacts 18—21 will not open until the contact 21 has been raised to a point to be latched up by the latch 20 and the prong 45 has again disengaged the contact 18.

As the springs 18—21 separate, voltage is reapplied to the transformer 30, and the electro-magnet 19 is energized through the following circuit:—beginning at the transformer 30, wire 31, winding of the electro-magnet 19, wires 32 and 37, bi-metallic thermostat element 2, stationary contact 71½°, wire 38, bi-metallic thermostat element 3, stationary contact 71°, wire 42, brush 14, (the insulated portion 46 of the commutator 11 now engaging the brush 13), brush 12, wire 36, back to the transformer 30. Flow of current in this circuit will attract the armature 20, thereby again releasing the spring contact 21, and the motor before actually coming to a stop will again be operated until the prong 47 of the spider 17 engages and again releases the spring contact 18. The contact springs 18 and 21 will be lifted as heretofore explained, after which the spring 18 will again be released and the transformer 30 reinserted in series with the motor M. At this time the insulated portion 46 is in engagement with the spring 14, so that there is no circuit available for energizing the electro-magnet 19 to attract its armature 20 and release contact 18 and therefore the furnace will remain in the half closed position as illustrated by one of the dotted positions of the crank 23 until the thermostat T¹ completes a new circuit. Also, it will be noted that with the insulation 46 under the brush 14, no current can flow to the compensating lamp 4 and this lamp will be extinguished. In this position of the regulating motor RM¹ the butterfly valve 26 is closed and the damper 28 is half open.

Let us now assume that the living room temperature rises still further and the bi-metallic thermostat element 2 moves from left to right and engages the stationary contact 72° when the temperature has reached 72 degrees. This will of course extinguish the indicating lamp 5 in that it will shunt the same, the electro-magnet 19 will be actuated by the increased current flowing, and the motor M¹ will be operated until the prong 45 of the spider 17 assumes the uppermost position, at which point the contact spring 18 is lifted up and again dropped, and during such lifting up the contact spring 21 is latched up so that these contacts 18—21 remain separate and the motor stops. At this point in the rotation of the shaft 6 the insulation 46 of the commutator 11 is below the brush 13, at which point both of the lamps 4 and 5 are extinguished and there is no circuit available for actuating the electro-magnet 19 until the temperature again falls.

In the same way as just explained a reduction in the temperature of the living room will cause the thermostat elements 2 and 3 to move from right to left in sequential steps, completing their respective circuits without the expenditure of any energy and therefore carry out this function accurately and to a small fraction of one degree, and this shifting of the thermostat elements 2 and 3 from right to left will cause the regulator motor RM¹ to assume corresponding positions, and will control the furnace F¹ all in a manner readily understood from the circuits already described. That is, in each case a control circuit is closed the regulating mechanism will operate until that circuit is broken by the insulation 46.

Attention is especially called to the manner in which the contacts 18—21 are closed by snap action and in so closing shunt the primary winding of transformer 30 and simultaneously therewith cut current off of the electro-magnet 19 and the thermostat elements 2 and 3. This snap action is highly desirable in that the contacts 18—21 are quickly closed to prevent arcing, and current is cut off of the thermostat elements 2 and 3 within the time of flow of one cycle of alternating current. Attention is also directed to the fact that the contacts 18—21 are operated by snap action when the spider 17 disengages the contact spring 18, so that the arc of the motor current is quickly broken, in this connection it should be noted that the transformer acts as a discharge impedance to discharge the motor arc. Again it should be noted that the thermostat T¹ is constructed to complete three different circuits at three different temperatures very accurately in that these thermostat elements 2 and 3 are not required to do any work in completing such circuits, as would be required if snap acting or wipe contacts were used.

Applicant has thus provided a thermostat capable of selecting three different and distinct circuits at three different specifically defined and distinct temperatures and interlocked in a manner so that only one of said circuits can be closed at one time. Further, snap controlled regulating mechanism has been provided which will operate dampers or fuel supply valves to a position corresponding to that of the particular of the three circuits that is closed, which includes a single contact which performs the double function of applying full voltage to a suitable motive power means and removing the source of energy from suitable snap action control means for controlling said single contact, the apparatus being constructed to furnish the last mentioned source of energy in the form of a low voltage source, so that only low voltage energy can reach the thermostat.

Figure 2:
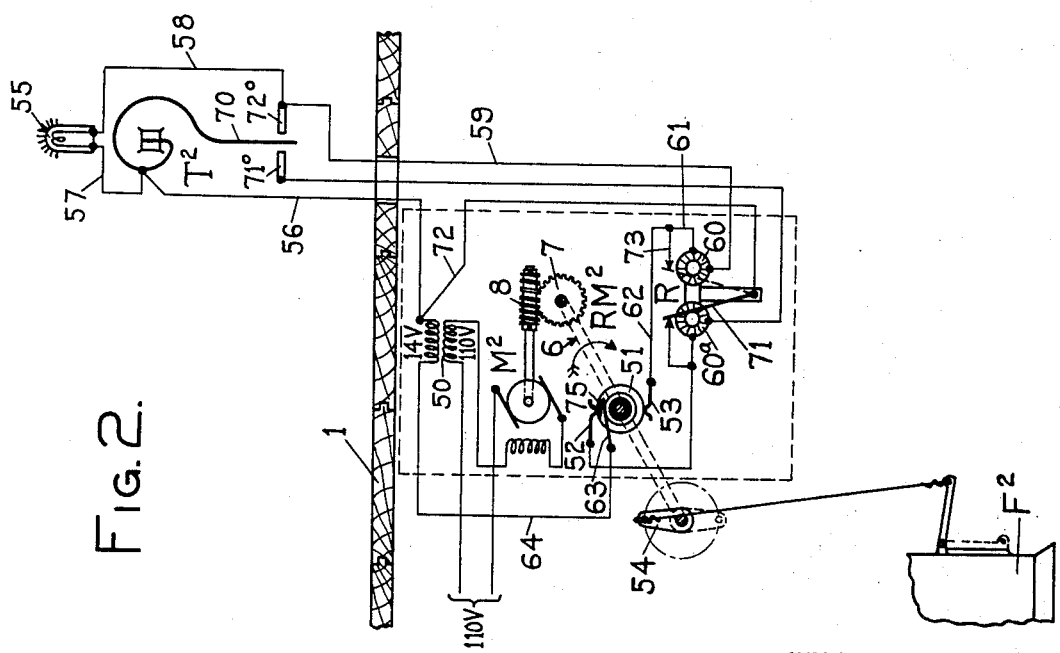
Fig. 2 shows a modified form of the invention applied to a two-position regulator, in which the snap action short circuits the secondary of the transformer, and where this action is accomplished by electro-responsive means; and, Fig. 3 shows a still further modified construction in which the thermostat itself is a snap action device.

*Modified construction.*—In Fig. 2 there has been shown a modified form of the invention, in which the secondary winding 14V of the transformer 50 is short-circuited to produce operation of the motor M². It is of course understood that the motor M² in this form of the invention is preferably designed to operate on a slightly lower voltage than 110 volts, this because the short circuited impedance of the transformer 50 is included in series with the motor M² during operation of the motor. The regulating system shown in Fig. 2 is a two-position system, as distinguished from a three-position system, such as shown in Fig. 1 of the drawings. For this reason, the commutator 51 is provided with only two commutator brushes 52 and 53, these brushes being located on directly opposite sides of the commutator, so that the crank 54 will stop in either the upper or lower position. In the arrangement shown in Fig. 2 the snap action function is accomplished by a two-position two-coil toggle relay R, and the manner in which this relay relieves the thermostat T² from carrying current for more than an instant is more readily explained in connection with the operation of this system.

*Operation.*—Attention is directed to the fact that the pilot and compensating lamp 55 is illuminated, this because the regulating mechanism RM² assumes its furnace-open position. The circuit for this lamp may be traced as follows:—beginning at the secondary winding 14V of transformer 50, wires 56 and 57, lamp 55, wires 58 and 59, coil 60 of the relay R, wires 61 and 62, contact brush 53, commutator 51, contact brush 63, wire 64, back to the secondary winding of the transformer 50. The energizing current for the pilot light 55 is insufficient to actuate the relay R even though this current flows through the coil 60 of this relay as just pointed out. Also, this small amount of current drawn from the secondary of the transformer 50 allows insufficient current to flow through the motor M² to operate this motor. The heat given off by the lamp 55 will however, act to move the contact 70 toward the right, and if the thermostat is over compensated will actually effect engagement with the contact 72° before the room temperature actually changes.

Let us now assume that the bi-metallic thermal element 70 moves toward the right and engages the contact 72°. This causes the lamp 55 to be short-circuited and causes sufficient current to flow in the coil 60 of the relay R to operate the contact 71 of this relay to its right-hand dotted position. It should be noted that the coil 60 of the relay R only is energized, and that the midpoint of the magnetic core of this relay has a downwardly projecting position on which the armature 71 is pivoted, thus providing a good magnetic circuit for operating the armature 71. With the armature 71 operated to the right the secondary winding 14V of the transformer 50 is short-circuited through the following low resistance path:—beginning at the right-hand terminal of this winding 14V, wire 72, contact 71, wires 73 and 62, contact brush 53, commutator 51, contact brush 63, wire 64, back to the other terminal of this secondary winding 14V. With the secondary winding of the transformer 30 short-circuited, the impedance of the transformer 50 drops to a very low value and the motor M² is operated until the commutator 51 has rotated substantially through 180 degrees, at which time the insulation 75 interrupts the circuit just traced at the brush 53. The lamp 55 remains extinguished even though the thermostat contact 70 moves away from the stationary contact 72°, this because the circuit is now open at the brush 53.

In the same way as just explained movement of the bi-metallic thermal element 70 to the left causes the relay R to be moved back to its normal position through the medium of its coil 60ᵃ, and causes the regulating mechanism RM² to again assume the furnace-open position. It is thus seen that in the construction shown in Fig. 2 the contacts 71°—72° need only carry current for an instant sufficient to operate the relay R. In this connection attention is directed to the fact that as soon as the relay R is operated the contacts which were closed to operate the relay are short circuited by the contact 71 of this same relay R, so that the thermostat carries current for an instant only.

Figure 3:
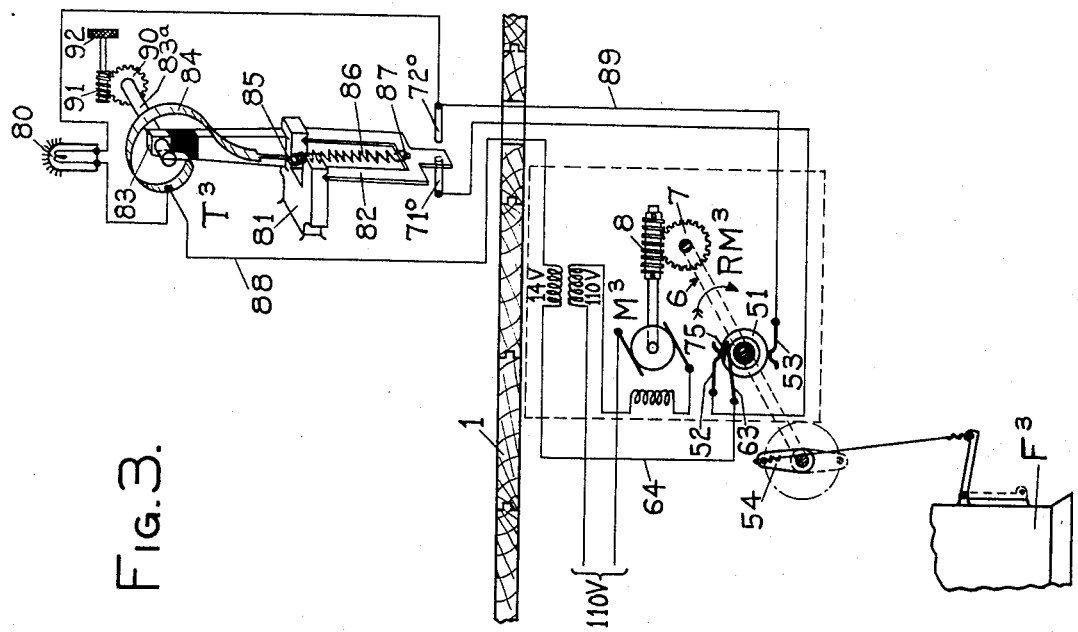

*Another modified construction.*—Referring to Fig. 3 of the drawings attention is directed to the fact that the transformer 50, the commutator 51, the brushes 52, 53 and 63 are exactly the same as those shown in Fig. 2 of the drawings, and for this reason have been assigned like reference characters. The principal distinction between the form of the invention in Fig. 3 and that shown in Fig. 2 is, in Fig. 3 there has been substituted a snap-action thermostat equipped with pilot and compensating lamp 80 for the plain thermostat T² and the relay R in Fig. 2 of the drawings. In other words, in the arrangement shown in Fig. 3, the thermostat is in itself snap acting, and for this reason the snap action relay R is unnecessary, this because there is no harm in the thermostat contacts carrying current for a long time providing these contacts are snap acting, and when closed are closed firmly. The snap-action thermostat T³ comprises a stationary anvil 81 having V-shaped grooves cut in the bottom thereof to receive knife-blade ends of an inverted U-shaped contact plate 82. This anvil 81 is suitably fastened to the thermostat housing and carries the block 83 insulated therefrom, on which the bi-metallic thermostat metal strip 84 is fastened. This block 83 carries a rotatable shaft 83ᵃ rotated through the medium of a worm wheel 90, rotatable by the worm 91 having a knurled head 92. The lower end of the bi-metallic thermostat scroll 84 terminates in a narrow portion having a hook 85 at the end thereof, into which a tension coil spring 86 is engaged, the other end of this spring 86 being hooked into a hole 87 at the middle lower end of the contact blade 82. This contact blade 82 in the position shown in the drawings engages the stationary contact 71°, and it will readily appear that movement of the hook 85 toward the right will eventually cause the lower extremity of this hook 85 to get beyond the knife-edge bearing, formed by the blade 82 engaging the grooves of the anvil 81, so that the blade 82 by snap-action is moved quickly from the stationary contact 71° to engage the stationary contact 72°. It is believed expedient to briefly consider the operation of this modified system to bring out its operating characteristics.

*Operation.*—Let us assume that either the temperature in the living room rises or the compensating lamp 80 heats the scroll 84 to a point where the hook 85 gets beyond center, or the hook 85 is operated toward the right by an increase in temperature due to both these causes. This movement of the bi-metallic scroll to the right is of course always augmented by the heat given off by the pilot and compensating lamp 80 when this lamp is lighted. In this form of the invention the lamp 80 is considerably hotter than are the lamps 4, 5, and 55, this is resorted to because considerable more energy is required to operate a snap-action contact such as is included in the thermostat T³, and therefore this lamp is an important feature of the present invention. This movement of the lower end of the scroll thermostat element 84 to the right, causes the blade 82 to be operated by snap-action from the contact 71° against the contact 72°, thereby short-circuiting the lamp 80 and in turn short-circuiting the secondary winding of transformer 50 through the following low resistance circuit:—beginning at the secondary winding 14V of the transformer 50, wire 88, bi-metallic thermal element 84, hook 85, spring 86, contact blade 82, stationary contact 72°, wire 89, contact brush 53, commutator 51, contact brush 63, wire 64, back to the other terminal of the secondary winding 14V. With the secondary winding thus short-circuited, the impedance of the transformer 50 falls to an extremely low value thus effecting operation of the motor M² until the insulation 75 breaks the circuit at the brush 53 of the commutator 51. The lamp 80 will of course remain extinguished because it is shorted and its circuit is open at the brush 53. As the lamp 80 is now extinguished and therefore this in itself reduces the temperature of the thermostat element 84, a very slight further drop in the temperature of the living room will cause the contact blade 82 to be operated from its right-hand to its left-hand position by snap action, thereby short circuiting the transformer 50, through another circuit including the contact 71° and brush 52, readily traced in the drawings. In this connection it should be understood that if desired the lamp 80 may give off sufficient heat to operate the contact 82 from the left hand to the right hand position without an actual increase in room temperature. In such a case the thermostat T³ may be said to be over-compounded.

The form of the invention shown in Fig. 3 includes a very unique thermostat element which is so compensated that it will operate on extremely small temperature differences, or as above pointed out may be constructed to operate back and forth without any change in room temperature and with the damper actually disconnected. It may be pointed out that snap action thermostats for controlling circuits require a considerable amount of energy for their operation, and if it were attempted to operate contacts by snap-action without the additional energy derived from another source such as the compensating lamp 80, the contact could not be operated from one extreme position to the other extreme position unless the actual change in temperature of the room, in which the apparatus is located, were at least two or more degrees. In the arrangement shown if adjusted in a particular manner heat derived from the pilot and compensating lamp 80 serves to act on the thermostat element 84 in such a way that a very small change, such as one tenth of a degree, in room temperature will operate the snap-action thermostat. In other words, if one degree of temperature change is required to operate the thermostat element from the lower temperature to the higher temperature position, the lamp 80 will furnish nine tenth's of this required heat, and allow the room itself to supply the other one tenth of a degree. It is of course understood that although the various embodiments of the invention illustrated have been shown applied to furnaces of the solid fuel type, that the various regulating mechanisms such as may be applied to oil burners or gas burners in which case they control the fuel valves, are all within the scope of the present invention. Also, it should be understood that the pilot lamps 4, 5, 55 and 80 also serve as indicators, to indicate the position of dampers, fuel valves, fan operation, and the like, controlled by the regulator. Further, if the heating system is fueled by gas, an electrically operated gas valve, which is open when energized, may be connected in series with a source of current and the low temperature contact 71° of Fig. 3, in which case the lamp 80 is connected in series or in multiple with the winding of said gas valve, the flow of gas through the gas valve will of course be in a direction to hold the ball valve down.

Having thus shown and described several specific embodiments of the invention, and having shown rather specific circuit arrangements and devices for carrying out these embodiments, it is desired to be understood that this has been done for the purpose of facilitating description of the underlying principles of the invention and its operating characteristics, and have not been resorted to for the purpose of illustrating the scope of the invention or the exact construction preferably employed in practicing of the same, and that various changes, modifications and additions may be made to adapt the invention to the particular heating apparatus to which it is to be applied, all without departing from the spirit or scope of the invention or the idea of means underlying the same, except as demanded by the scope of the following claims.

What I claim as new is:—

1. In a heating system; a furnace adjustable to cause it to give off a maximum, a medium or a small amount of heat; a regulating mechanism having three lead-in wires the first of which if energized will adjust said furnace to give off a small amount of heat, the second of which if energized will adjust the furnace to the medium heat position and the third of which if energized will adjust said furnace to the maximum heat position; a source of current; and a thermostat for connecting said source of current to one of said lead-in wires only comprising, a first thermal element which if it assumes one temperature position connects said source to said first wire, if it assumes another temperature position connects said source to a second thermal element, said second thermal element when assuming one temperature position engaging said second lead-in wire and when assuming another temperature position engaging said third lead-in wire, whereby said source may be connected to three different wires at three different temperatures without any frictional engagement.

2. A regulating machine for controlling a furnace comprising, a source of alternating current, a motor connected to said source, a transformer having its primary winding connected in series with said motor and source, a two coil toggle operated relay having a double throw contact, a commutator driven by said motor which when it assumes one position short circuits the secondary winding of said transformer if said double throw contact assumes a non-corresponding position and which when it assumes another position short circuits said secondary winding if said double throw contact assumes its opposite position, and a thermal responsive double throw contact connected to operate said toggle operated relay to a particular position corresponding to the position of said double throw contact and so that the double throw contact of said relay short circuits the said thermal responsive contacts which effected its operation to said particular position.

3. A regulating machine for controlling a furnace comprising, a source of alternating current, a motor connected to said source, a transformer having its primary winding connected in series with said motor and source, a two coil toggle operated relay having a double throw contact, a commutator driven by said motor which when it assumes one position short circuits the secondary winding of said transformer if said double throw contact assumes a non-corresponding position and which when it assumes another position short circuits said secondary winding if said double throw contact assumes its opposite position, a thermal responsive double throw contact connected to operate said toggle operated relay to a particular position corresponding to the position of said double throw contact and so that the double throw contact of said relay short circuits the said thermal responsive contacts which effected its operation to said particular position, and an auxiliary heat source for actuating said thermal responsive contacts effective when the said contacts of said toggle operated relay assume the low temperature position.

4. In a furnace regulator, the combination with a heat control means of a furnace, of an automatic controller controlling said means comprising, a motor, a shaft driven by said motor, a transformer having its primary winding connected in series with said motor and across a source of alternating current, electroresponsive means for short-circuiting the primary winding of said transformer the energy for operation thereof being derived from the secondary winding of said transformer, and thermal responsive means for controlling said electroresponsive means.

5. In a furnace regulator, the combination with a heat control means of a furnace, of an automatic controller therefor comprising, a motor, a shaft driven by said motor, a transformer having its primary winding connected in series with said motor and across a source of alternating current, electroresponsive means for short-circuiting the primary winding of said transformer and said electroresponsive means deriving the energy for operation thereof from the secondary winding of said transformer, and thermal responsive means for controlling said electroresponsive means.

6. In a furnace regulator, the combination with a heat control means of a furnace; of an automatic controller for controlling said means comprising; a motor, a shaft driven by said motor; a transformer having its primary winding connected in series with said motor and across a source of alternating current; electroresponsive snap action circuit closing means, which if momentarily energized closes its contacts permanently until restored, for short circuiting the primary winding of said transformer, and connected to derive its operating current from the secondary winding of said transformer; and thermal responsive means for controlling said electroresponsive snap action means.

7. In a furnace regulator, the combination with a heat control means of a furnace, of automatic control means therefore comprising, a motor, a shaft driven by said motor, a transformer having its primary winding connected in series with said motor and across a source of alternating current; electroresponsive snap action circuit closing means, which if momentarily energized closes its contacts permanently until restored, for short circuiting the secondary winding of said transformer, and connected to derive its operating current from the secondary winding of said transformer; and thermal responsive means for controlling said snap action means.

8. A regulating machine for controlling a furnace comprising, a source of alternating current, a motor connected to said source, a transformer having its primary winding connected in series with said motor, contacts for short-circuiting the primary winding of said transformer to effect operation of said motor, thermal responsive means for controlling the operation of said contacts, and an auxiliary heating element adjacent said thermal responsive means rendered active when said regulating machine is in a furnace-active position.

9. A regulating machine for controlling a furnace comprising, a source of alternating current, a motor connected to said source, a transformer having its primary winding connected in series with said motor, contacts for short-circuiting the primary winding of said transformer to effect operation of said motor, thermal responsive means for controlling the operation of said contacts, and compensating means for changing the operating characteristic of said thermal responsive means in accordance with the operated position of said regulating machine.

10. A regulating machine for controlling a furnace comprising, a source of alternating current, a motor connected to said source, a transformer having its primary winding connected in series with said motor, contacts for short-circuiting the primary winding of said transformer to effect operation of said motor, thermal responsive means for controlling the operation of said contacts, and indicating means located remote to said regulating machine to indicate when said regulating machine is in its furnace active position.

11. A regulating machine for controlling a furnace comprising, a source of alternating current, a motor connected to said source, a transformer having its primary winding connected in series with said motor, a circuit branch for short-circuiting said transformer to effect operation of said motor, snap-action thermal responsive means for closing said circuit branch, and means mechanically operated by said motor for opening said circuit branch.

12. A regulating machine for controlling a furnace comprising, a source of alternating current, a motor connected to said source, a transformer having its primary winding connected in series with said motor, a circuit branch for short-circuiting said transformer when said regulating machine assumes a furnace-active position, another circuit branch for short-circuiting said transformer when said regulating machine assumes a furnace-inactive position, snap-action thermal responsive means for closing said circuit branches at another point, and means mechanically operated by said motor for opening said circuit branches.

13. In a furnace regulating system, the combination with a shaft which may assume a furnace-active and a furnace-inactive position; a transformer having a primary winding and a secondary winding; a motor for driving said shaft; a source of alternating current; a circuit including said source, said motor and the primary winding of said transformer in series; two circuit branches for short-circuiting the secondary winding of said transformer, one open when said shaft assumes the furnace-active position and the other open when said shaft assumes the furnace-inactive position, and snap-action thermal responsive means for closing one or the other of said two circuits at another point.

14. In a furnace regulating system; the combination with a shaft which may assume a furnace-active and a furnace-inactive position; a transformer having a primary winding and a secondary winding; a motor for driving said shaft; a source of alternating current; a circuit including said source, said motor and the primary winding of said transformer in series; two circuit branches for short-circuiting the secondary winding of said transformer, one open when said shaft assumes the furnace-active position and the other open when said shaft assumes the furnace-inactive position, and a contact biased to assume one or the other of two extreme positions for closing one or the other of said two circuits, and thermal responsive means for actuating said contact.

15. In a furnace regulating system; the combination with a shaft which may assume a furnace-active and a furnace-inactive position; a transformer having a primary winding and a secondary winding; a motor for driving said shaft; a source of alternating current; a circuit including said source, said motor and the primary winding of said transformer in series; two circuit branches for short-circuiting the secondary winding of said transformer, one open when said shaft assumes the furnace-active position and the other open when said shaft assumes the furnace-inactive position, and a contact biased to assume one or the other of two extreme positions for closing one or the other of said two circuits, and bi-metallic metal for mechanically actuating said contact from one to the other of its positions in response to temperature changes.

16. In a furnace regulating system; the combination with a shaft which may assume a furnace-active and a furnace-inactive position; a transformer having a primary winding and a secondary winding; a motor for driving said shaft; a source of alternating current; a circuit including said source, said motor and the primary winding of said transformer in series; two circuit branches for short-circuiting the secondary winding of said transformer, one open when said shaft assumes the furnace-active position and the other open when said shaft assumes the furnace-inactive position, a contact biased to assume one or the other of two extreme positions for closing one or the other of said two circuits, electro-responsive means for actuating said contact to said one or said other position; and thermal-responsive means for controlling said electro-responsive means.

17. In a furnace regulating system; the combination with a shaft which may assume a furnace-active and a furnace-inactive position; a transformer having a primary winding and a secondary winding; a motor for driving said shaft; a source of alternating current; a circuit including said source, said motor and the primary winding of said transformer in series; two circuit branches for short-circuiting the secondary winding of said transformer, one open when said shaft assumes the furnace-active position and the other open when said shaft assumes the furnace-inactive position, a contact biased to assume one or the other of two extreme positions for closing one or the other of said two circuits, two coils one for operating said contact to said one position and the other for operating said contact to said other position, and a thermal responsive element for closing a circuit through one or the other of said two coils.

18. In a furnace regulating system; the combination with a shaft which may assume a furnace-active and a furnace-inactive position; a transformer having a primary winding and a secondary winding; a motor for driving said shaft; a source of alternating current; a circuit including said source, said motor and the primary winding of said transformer in series; two circuit branches for short-circuiting the secondary winding of said transformer, one open when said shaft assumes the furnace-active position and the other open when said shaft assumes the furnace-inactive position, a contact biased to assume one or the other of two extreme positions for closing one or the other of said two circuits, two coils one for operating said contact to said one position and the other for operating said contact to said other position, a control circuit branch for energizing one of said coils shunted when said contact assumes a position to which it may be operated by said one coil, a control circuit branch for energizing the other of said coils shunted when said contact assumes a position to which it may be operated by said other coil, and thermal responsive means for controlling the closing of said control circuit branches.

19. In a furnace regulator, a shaft having a furnace-active and a furnace-less-active position, an electric motor for driving said shaft, a source of current for operating said motor, a double throw contactor adapted to assume either of two extreme contacting positions and which, upon a gradual change in temperature, operates suddenly from one contacting to the other contacting position by snap acting means and two control circuits for effecting operation of said motor, each of said circuits carrying current of insufficient voltage to operate said motor, one of which circuits is closed when said double throw contactor assumes one contacting position and the shaft assumes the furnace-active position, but opened just before said shaft reaches the furnace-inactive position, and the other of which circuits is closed when said double throw contactor assumes the other contacting position and said shaft assumes the furnace-less-active position, but opened just before said shaft reaches the furnace-active position.

20. In a furnace regulator, a shaft having a furnace-active and a furnace-less-active position, an electric motor for driving said shaft, a source of current for operating said motor, a double throw contactor adapted to assume either of two extreme contacting positions and which, upon a gradual change in temperature, operates suddenly from one contacting to the other contacting position by snap acting means and two control circuits for effecting operating of said motor, each of said circuits carrying current of insufficient voltage to operate said motor, one of which circuits is closed when said double throw contactor assumes one contacting position and said shaft is not in its furnace-less-active position, and the other of said circuits is closed when said double throw contactor assumes the other contacting position and said shaft is not in its furnace-active position.

21. In combination; a motor for operating heat control means to two different positions; two circuits for controlling the operation of said motor, each including contacts opened when said heat control means has been operated to the corresponding position; an electro-responsive device having two coils one included in each of said two circuits; temperature controlled contacts for closing one or the other of said two circuits; and a contact on said electro-responsive device which if in one position shunts the coil and its associated temperature controlled contact in one of said circuits, and when in another position shunts the coil and its associated temperature controlled contact in the other of said circuits.

22. In combination; a motor for operating heat control means to two different positions; two circuits for controlling the operation of said motor each including contacts opened when said heat control means has been operated to the corresponding position; an electro-responsive device having two coils one included in each of said two circuits; temperature controlled contacts for closing one or the other of said two circuits; and a contact on said electro-responsive device which if in one position shunts the coil which can operate said contact to said one position and also the temperature controlled contact in series therewith, and when in the other position shunts the other coil and the temperature controlled contact in series therewith.

23. In combination; a motor for operating heat supply means to two different positions; a two position electro-responsive device having contacts for closing one or the other of two circuits for controlling the operation of said motor to operate said heat supply means to one or the other of its different positions; a thermostat having contacts for controlling said electro-responsive device; and a circuit organization interconnecting said motor, said electro-responsive means and said thermostat, and arranged to include an operating coil of said electro-responsive means in a circuit for controlling said motor and in series with one contact of said thermostat in a manner that operation of said electro-responsive means shunts said operating coil and said one contact out of the circuit for controlling said motor, whereby the same contact that controls said motor also shunts current away from said thermostat.

24. In a heat regulating system, the combination with a furnace regulating machine having a plurality of control circuits and an alternating current motor of relatively low impedance for operating said machine, a transformer the primary of which has a relatively high impedance and is normally in series with said motor and a switch for short circuiting said transformer primary.

25. In a heat regulating system, the combination with a furnace regulating machine having a plurality of control circuits and an alternating current motor of relatively low impedance for operating said machine, a transformer the primary of which has a relatively high impedance and is normally in series with said motor and a switch for short circuiting said transformer primary, said switch being operated by an electromagnet energized by the secondary of said transformer.

26. In a heat regulating system, the combination with a furnace regulating machine having a plurality of control circuits and an alternating current motor of relatively low impedance for operating said machine, a transformer the primary of which has a relatively high impedance and is normally in series with said motor and a switch for short circuiting said transformer primary, said switch being operated by an electromagnet energized by the secondary of said transformer, and a thermostat for controlling said control circuits.

27. In a regulating system, the combination with a regulating machine, a plurality of control circuits therefor, and an alternating current motor of relatively low impedance for operating said machine, a transformer the primary of which has a relatively high impedance and is normally in series with said motor and a switch for short circuiting said transformer primary.

28. A regulating system comprising a regulating machine, an alternating current motor of relatively low impedance for operating said machine, a source of current for operating said motor, a plurality of control circuits for said motor, a transformer the primary of which is of relatively high impedance and in series with said motor, the secondary of said transformer being included in said control circuits, and a switch in said control circuits for short circuiting said transformer primary whereby the impedance of the circuit including said source of current and said motor is made relatively low.

29. In a heat regulating system the combination of a furnace regulating machine, a motor for operating said machine, a circuit for energizing said motor, three or more control circuits carrying current insufficient to operate said motor and each adapted when energized to effect completion of said motor energizing circuit, and thermostatic means for energizing any one of said control circuits, but only one at a time, and means for rendering inoperative said control circuits during the execution of any predetermined movement of said machine whereby stalling of the machine due to intervening operations of the control circuit is avoided.

30. In a heat regulating system the combination of a furnace regulating machine, a motor for operating said machine, a motor energizing circuit, a plurality of control circuits separate from said motor energizing circuit each carrying current insufficient to operate said motor and adapted when energized to cause said motor to be energized, a source of current for said control circuits, a thermostat for energizing any one of said control circuits and means for short circuiting said source of current when said motor is in operation.

31. In a heat regulating system the combination of a furnace regulating machine, a motor for operating said machine, a motor energizing circuit, a plurality of control circuits each carrying current insufficient to operate said motor and adapted when energized to cause said motor to be operated, a thermostat operative to complete said control circuits, a source of current and a switch movable to one position to supply current from said source to said control circuits and movable to another position to de-energize said control circuits.

32. In a heat regulating system the combination of a furnace regulating machine, a motor for operating said machine, a motor energizing circuit, a plurality of control circuits each carrying current insufficient to operate said motor and adapted when energized to cause said motor to be operated, a thermostat operative to complete said control circuits, a source of current and a switch movable to one position to supply current from said source to said control circuits and movable to another position to de-energize said control circuits and energize said motor energizing circuit to operate said motor.

OSCAR H. DICKE.